A. P. WARE.
Carriage-Wheel.
No. 61,962.  Patented Feb. 12, 1867.
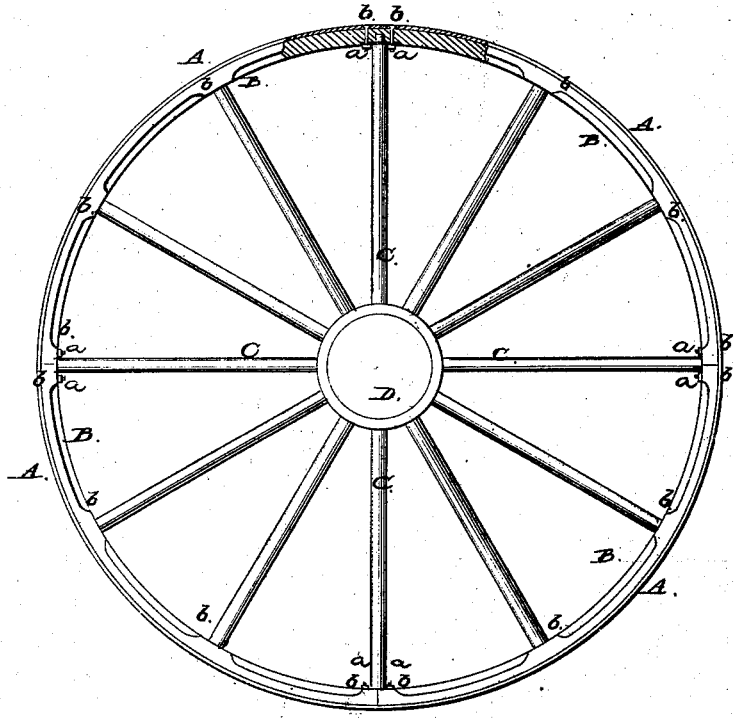

United States Patent Office.

ADAM P. WARE, OF CAMDEN COUNTY, NEW JERSEY.

Letters Patent No. 61,962, dated February 12, 1867; antedated January 28, 1867.

IMPROVEMENT IN METALLIC CARRIAGE-WHEELS.

*The Schedule referred to in these Letters Patent and making part of the same.*

TO ALL WHOM IT MAY CONCERN:

Be it known that I, ADAM P. WARE, of the county of Camden, in the State of New Jersey, have invented certain new and useful Improvements in "Metallic Carriage-Wheels," which I verily believe were never known before; and I do hereby declare that the following is a full and exact description of the construction and operation thereof, reference being had to the annexed drawing, making a part of this specification, and to the letters of reference marked thereon, in which—

The drawing is a side view of the wheel; A, the rim or tire; B, the metallic felloes; C, the spokes; D, the hub; a, the screws and nuts; b, the plates for fastening the felloes together at the several joints, and into which the ends of the spokes are set, and for binding the tire to the felloes, as seen in section at the top of the drawing, where a segment of the felloe is removed. In the construction of my invention I cast the felloes of malleable iron in four parts. These parts of the wheel are fastened together by plates b, and screws and nuts a. The plates are made to fit to the inner surface of the felloes, and the screws a pass through the tire, the felloes, and the plates, when they are securely fastened by the nuts being screwed on. These plates have each a hole in them, into which the spoke is let, as seen at the top of the drawing, where the spoke is shown let into the plate. I may find it convenient to cast the felloes with the projections on them with holes to receive the spoke, or I may use the plate for each spoke, but shall always use the plates, bolts, and nuts where the joints are for connecting the same together, and forming the rim of the wheel. The hub is formed as hubs are usually made, into which I let or set the spokes. The felloes are then put on in sections of fours, more or less, when they are driven down, the plates first being fitted on the spokes, when the bolts are put through the rim, felloes, and plate, and securely fastened in, the nuts a being screwed on, and the wheel is ready for use.

Having thus fully described my invention, what I claim as new, and desire to secure by Letters Patent, is—

Constructing a wheel for carriages, substantially as described, when the felloes B are made of malleable iron, and constructed and fitted together with the plates b, nuts a, and spokes C, in the manner described.

ADAM P. WARE.

Witnesses:
    Jo. C. CLAYTON,
    V. C. CLAYTON.